April 14, 1953 W. P. TAYLOR, JR., ET AL 2,634,918
WINDING MACHINE
Filed July 28, 1949 8 Sheets-Sheet 1

INVENTORS
Walter P. Taylor, Jr.
Jack van Horn Whipple
BY Bailey, Stephens, & Huettig
ATTORNEYS

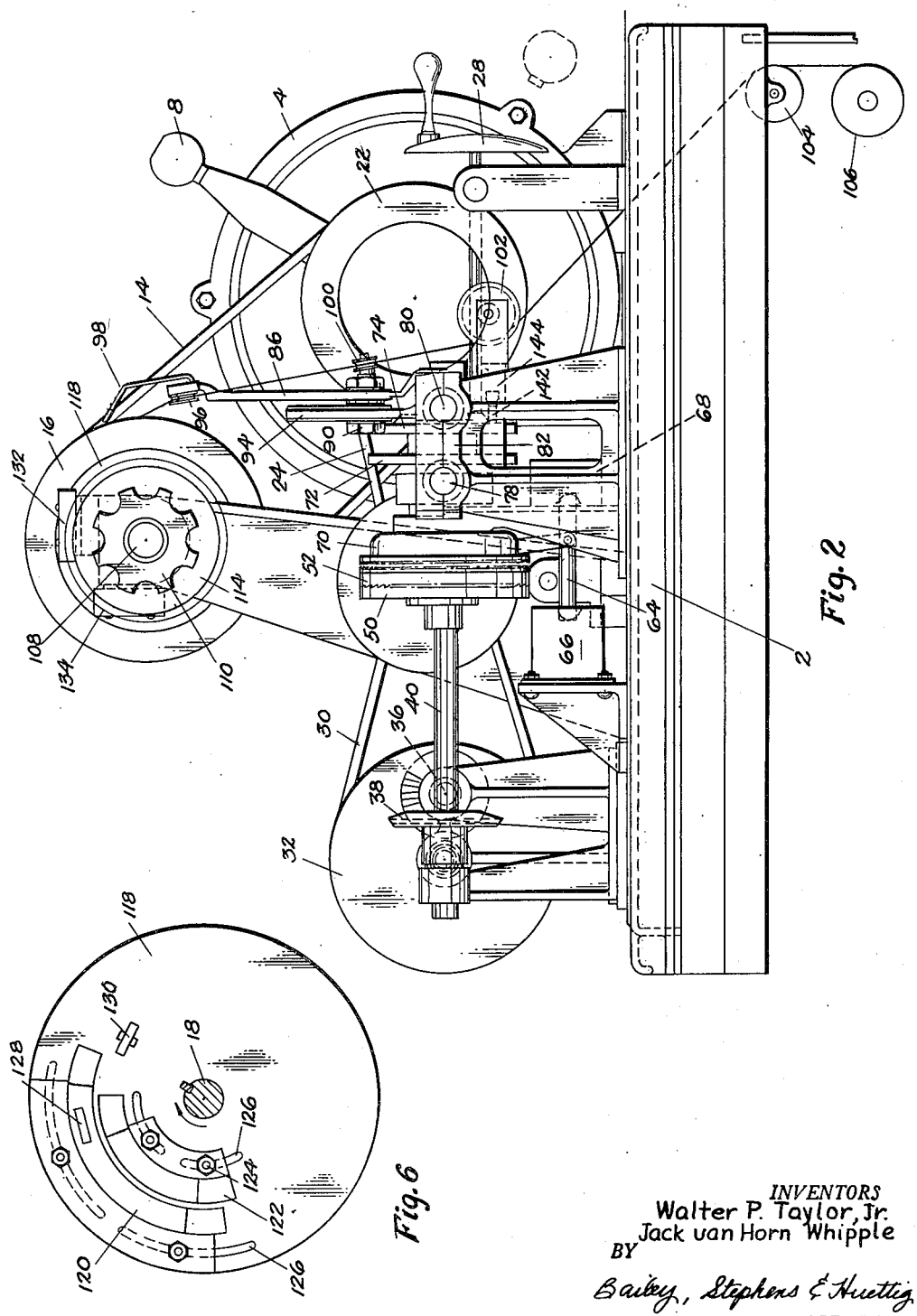

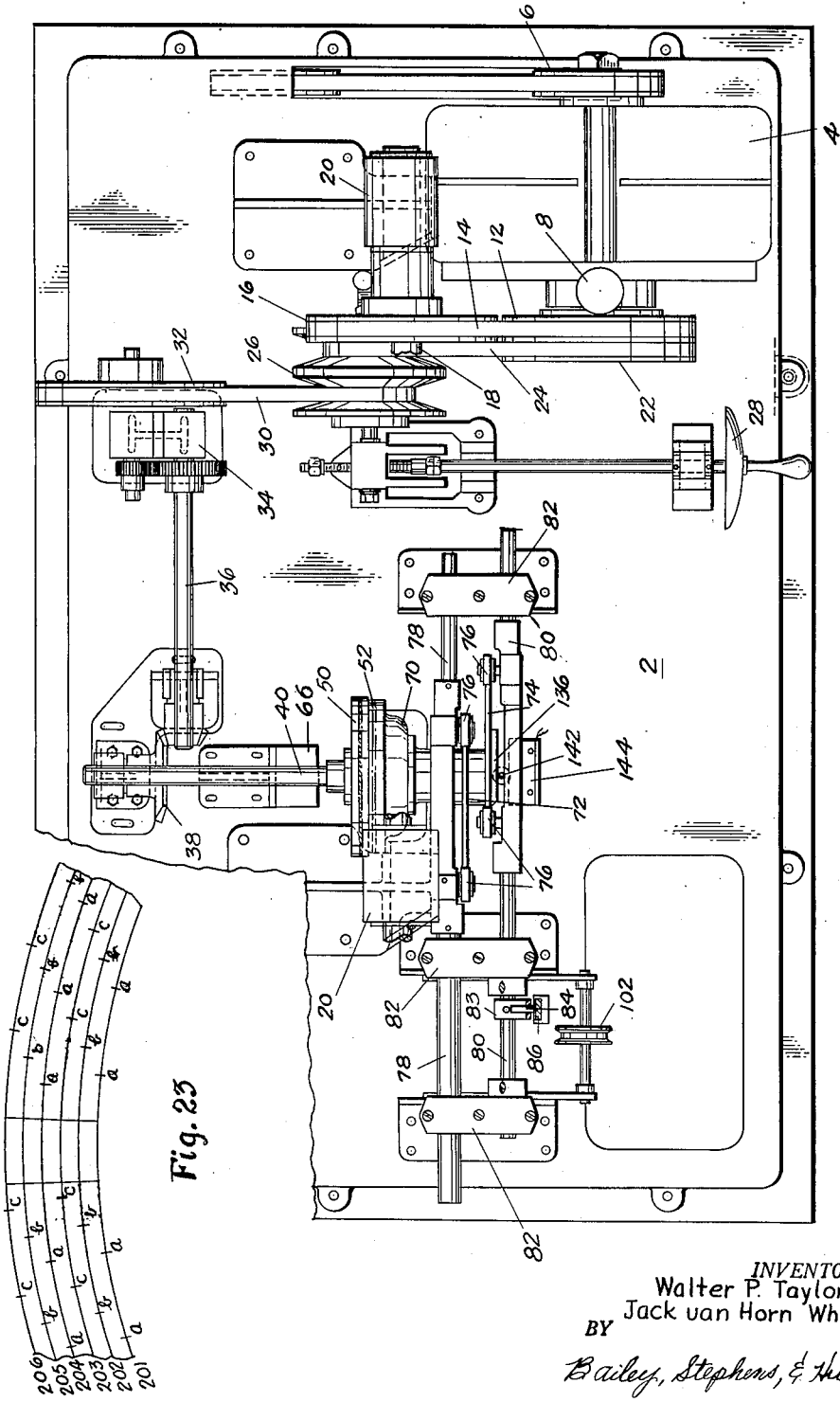

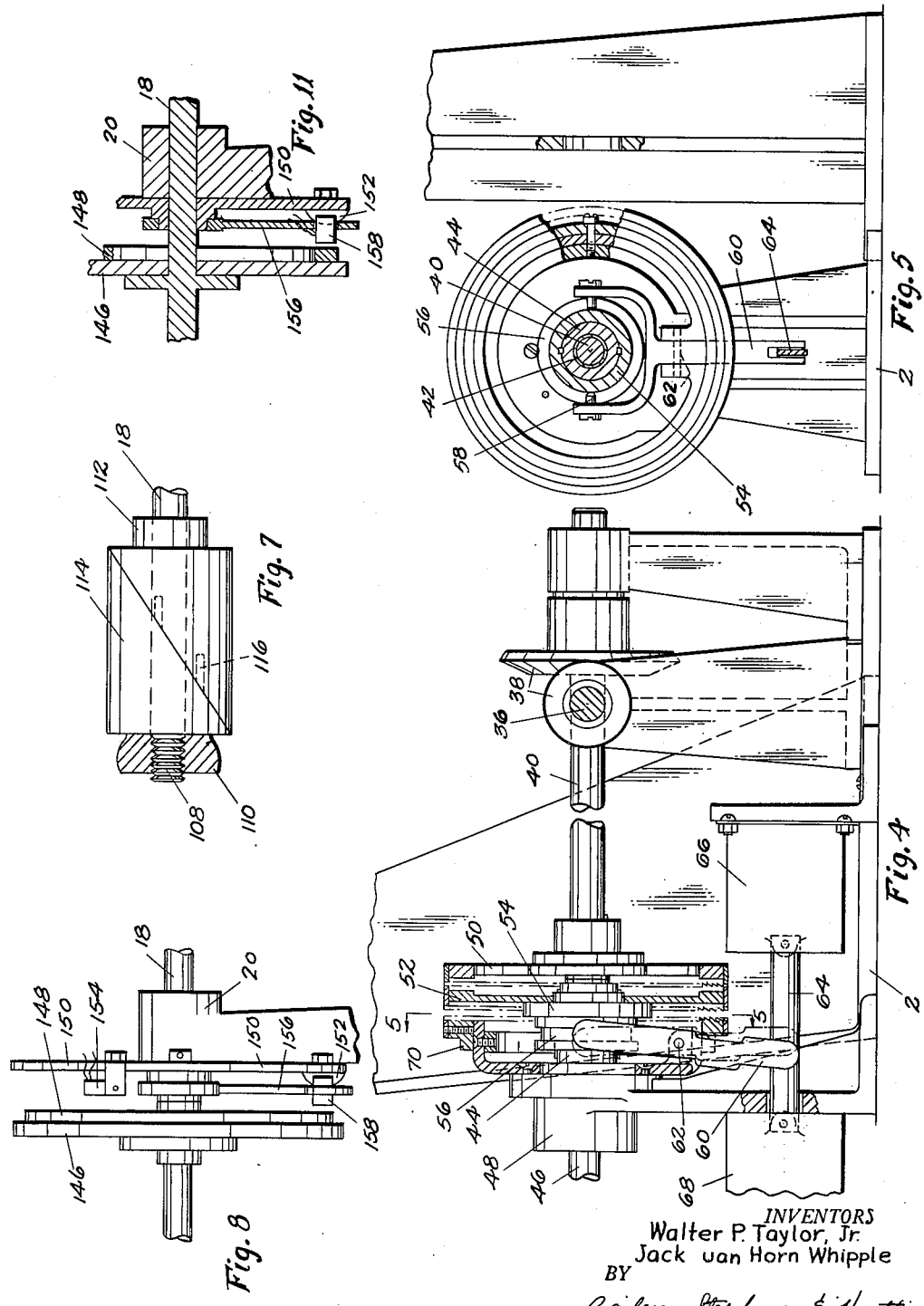

INVENTOR.
Walter P. Taylor, Jr.
Jack van Horn Whipple
BY Bailey, Stephens, & Huettig
ATTORNEYS

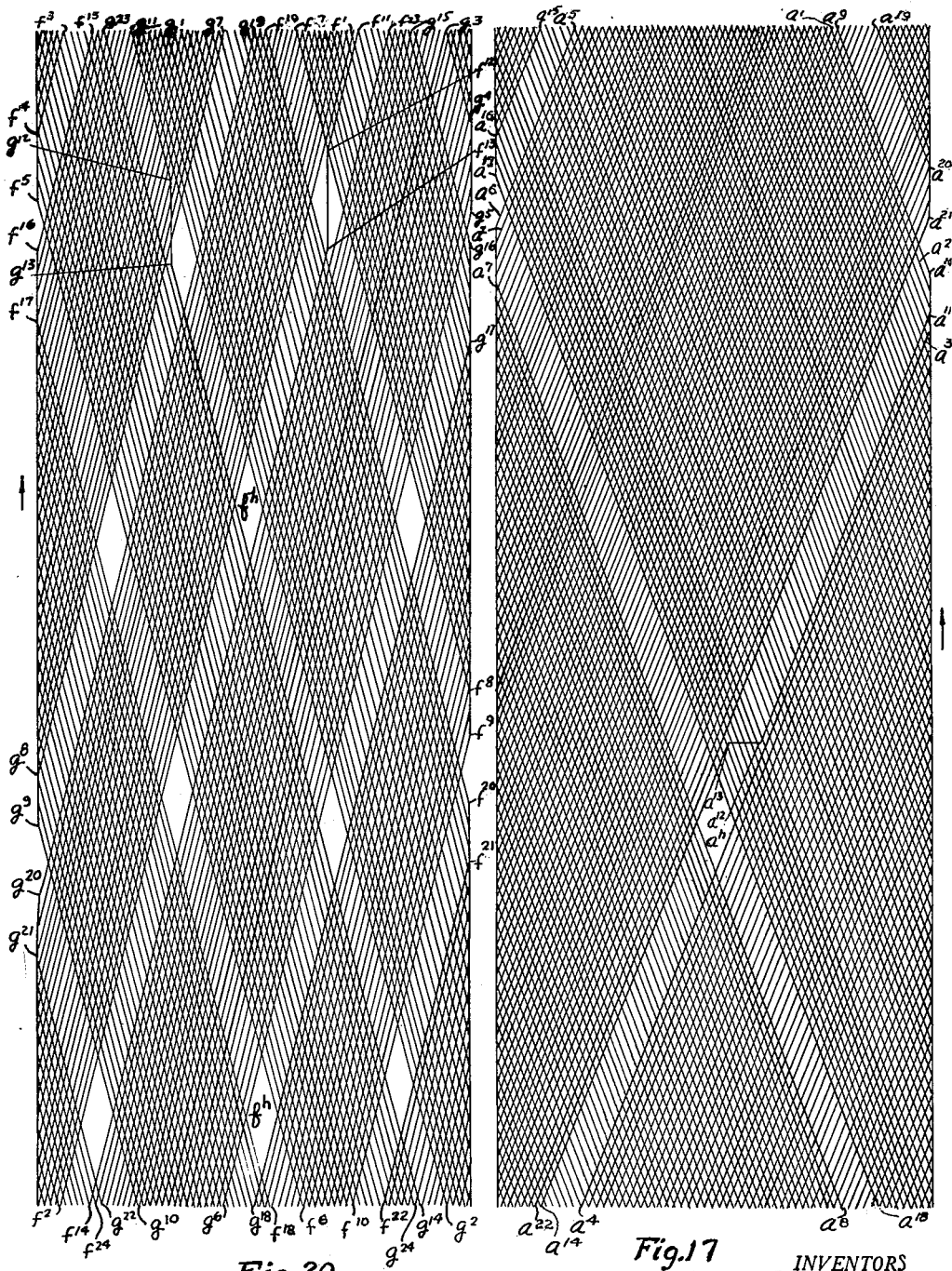

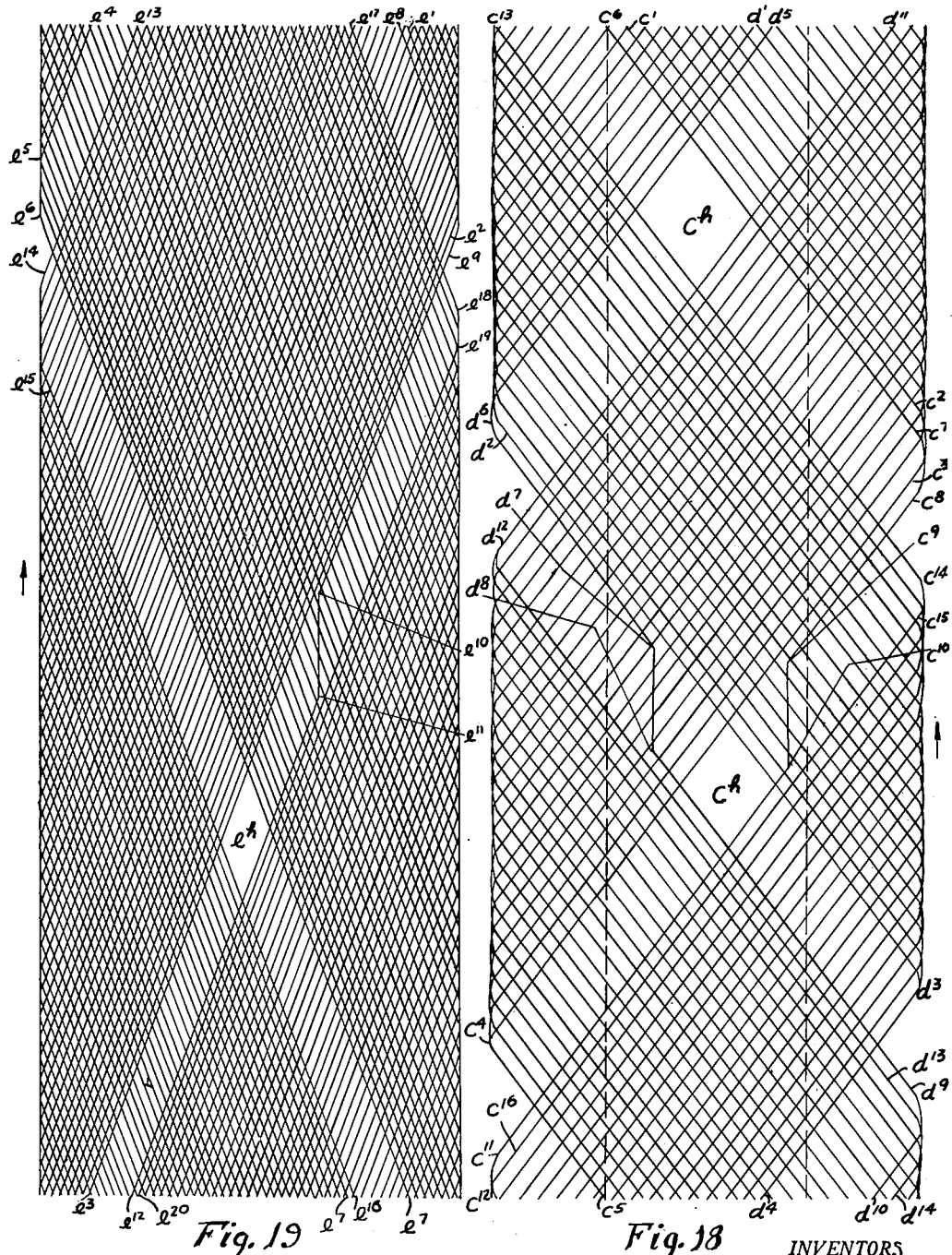

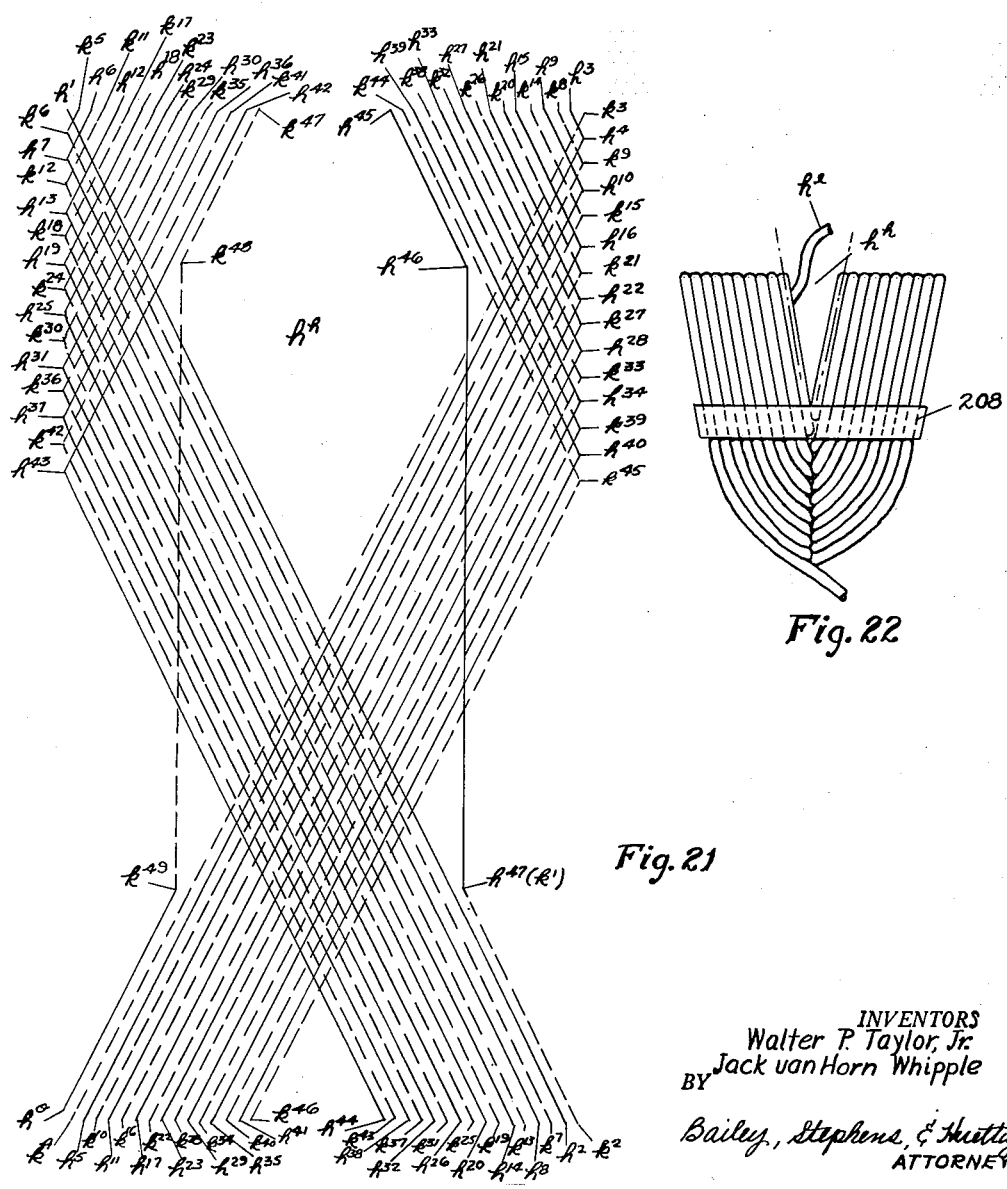

Patented Apr. 14, 1953

2,634,918

UNITED STATES PATENT OFFICE 2,634,918

WINDING MACHINE

Walter P. Taylor, Jr., and Jack Van Horn Whipple, New York, N. Y., assignors to Walter P. Taylor, Jr., New York, N. Y.

Application July 28, 1949, Serial No. 107,166

32 Claims. (Cl. 242—43)

The invention relates to winding machines, and more especially to machines for winding long lengths of flexible material.

The primary object of the invention is to provide a simple and efficient machine for winding packages of flexible material of the type described in detail in the application of Walter P. Taylor, Jr., entitled "Package," Serial No. 107,165, filed July 28, 1949. In a prior application of the said Walter P. Taylor, Jr., entitled "Winding," Serial Number 693,441, filed August 28, 1946, there has been described a machine for winding a package of flexible material having an unobstructed opening therethrough formed by the spindle of the machine on which the package is wound and having a hole radial to such opening through which the inner end of the material is withdrawn. In such a package, kinking and snarling of the material is prevented, without its being necessary to mount the package on a reel or otherwise to rotate it during withdrawal of the flexible material.

The package formed as described in this earlier application is suitable for many uses, but has some disadvantages for certain purposes. In the earlier package, the portions of certain of the coils at the point where the hole is formed are displaced so as to overlie other coils of the same layer, so that there is a tendency to build up a bulge at this point around the hole. The package may be somewhat unsightly by reason of this bulge, and the overlapping of the coils may at times damage the wound substance through pressure on it at this point.

The present invention produces a package in which the overlapping of the coils in the same layer is avoided, and the consequent disadvantages of the earlier package are overcome. More particularly, the present machine is designed to produce a package formed of a plurality of layers each formed of a plurality of helical coils laid successively around the package, each coil preferably crossing the next preceding coil intermediate the ends of the body, with the crossing points successively angularly spaced around the body. Between certain of the coils a wider spacing is provided, at the same angular position in each layer, so that, where the gaps so formed cross each other, a hole will be left radially into the core opening of the package. The package so formed then has an unobstructed core opening and a radial hole built into the coil by the winding thereof, without the formation of a bulge by the displacement of coils of the same layer to overlie each other at the sides of the hole. In fact, the package produced according to the present invention may have shallow helical valleys therearound, although the appearance of these valleys may be greatly minimized in the manner to be described hereinafter.

The invention contemplates the provision of a spindle which is rotated to wind the flexible material thereon, and a guide which is moved back and forth along the spindle to form layers each including a series of helical coils of the flexible material on the spindle. The movements of the spindle and guide are slightly out of phase, so that the crossing points of the helices of each layer are successively angularly displaced around the package. This displacement is referred to as the advance, which may be either positive or negative, depending on the relative speeds of the guide and spindle. For example, if the guide makes about one complete reciprocation for each two rotations of the spindle (hereinafter referred to as a "one" wind, the number "one" being the ratio between the number of rotations of the spindle and twice the number of complete oscillations of the guide), the speed adjustment might be such that, for each sixty revolutions of the spindle, the guide would make twenty-nine complete oscillations (positive advance) or thirty-one complete oscillations (negative advance), or some fractional number close to thirty. The angular displacement between successive crossovers in such an arrangement would then be about twelve degrees.

According to the present invention, this advance is greatly increased at one point, so that the angular spacing between the crossovers is substantially greater, and the lineal distance between the successive helices is also much greater. This is accomplished by varying the relative speed of the spindle and guide at least once during the formation of each layer, and at the same angular position in successive layers. This may be accomplished, for example, by stopping the movement of one of the two members while the other continues to move, or by slowing up one with respect to the other. Preferably, the guide is retarded or stopped in winding with a positive advance, and the spindle in winding with a negative advance.

The invention provides a control mechanism for this purpose which is controlled in synchronism with the movements of the guide and spindle. This mechanism preferably is electrical, and includes solenoids operating, first, a clutch connecting either the spindle or the guide to the driving means, and, second, a brake. Switches are provided which are closed at least once in each rotation of the spindle and in each complete reciprocation of the guide respectively. By reason of the fact that the spindle and guide are out of phase, these switches will be simultaneously closed once during each cycle of operation, that is, once during the formation of each layer, when the guide and spindle are, so to speak, in phase. The switches are connected in series to the solenoid, so that the movement is interrupted at the same point in each layer, leaving helical valleys formed by the wider separation of successive coils. Where these valleys cross, a radial hole will be formed.

The invention further contemplates a braking means coupled with the clutch for positively stopping the movement of the disengaged member as soon as the clutch is released. This aids in laying up a more exactly formed hole, by preventing the continued movement of the disengaged member through the momentum which it has when the clutch is disengaged.

The invention also contemplates the use of a timing or angular spacing mechanism, for ensuring the required degree of advance throughout each hole or valley building operation.

If the same relative rates of rotation are maintained during the winding of all the layers, the valleys will overlie each other and may be quite noticeable. This may give to the coil an unattractive appearance, and may detract somewhat from its self-sustaining qualities. By changing the general relative speeds of the spindle and guide after a number of layers, the coincidence of the valleys can be substantially reduced. For example, by laying the first twenty layers with a "one" wind, the next twenty with a "two" wind and the next twenty with a "four" wind, a package of sixty layers would be obtained in which the valleys would be relatively shallow and the self-sustaining property of the package substantially unimpaired.

Further objects and advantages of the invention will appear more fully from the following description, especially when taken in conjunction with the accompanying drawings which form a part thereof.

In the drawings:

Fig. 2 is a view from the left of Fig. 1;

Fig. 3 is a top plan view, with parts broken away;

Fig. 4 is a detail side view, with parts in section, of the clutch and brake mechanism;

Fig. 5 is a cross-section substantially on the line 5—5 of Fig. 4;

Fig. 6 is a side view of the spindle shaft cam arrangement;

Fig. 7 is a detail view of the spindle;

Fig. 8 is a side elevation of the timing mechanism;

Fig. 11 is a cross-section through a part of such mechanism;

Figs. 17 and 18 are winding diagrams of the package of Figs. 15 and 16 respectively;

Figs. 19 and 20 are winding diagrams of other packages;

Fig. 21 is a diagram of still another type of package;

Fig. 22 is a top plan view of the package of Fig. 21; and

Fig. 23 is an explanatory diagram.

Figures 1, 14:
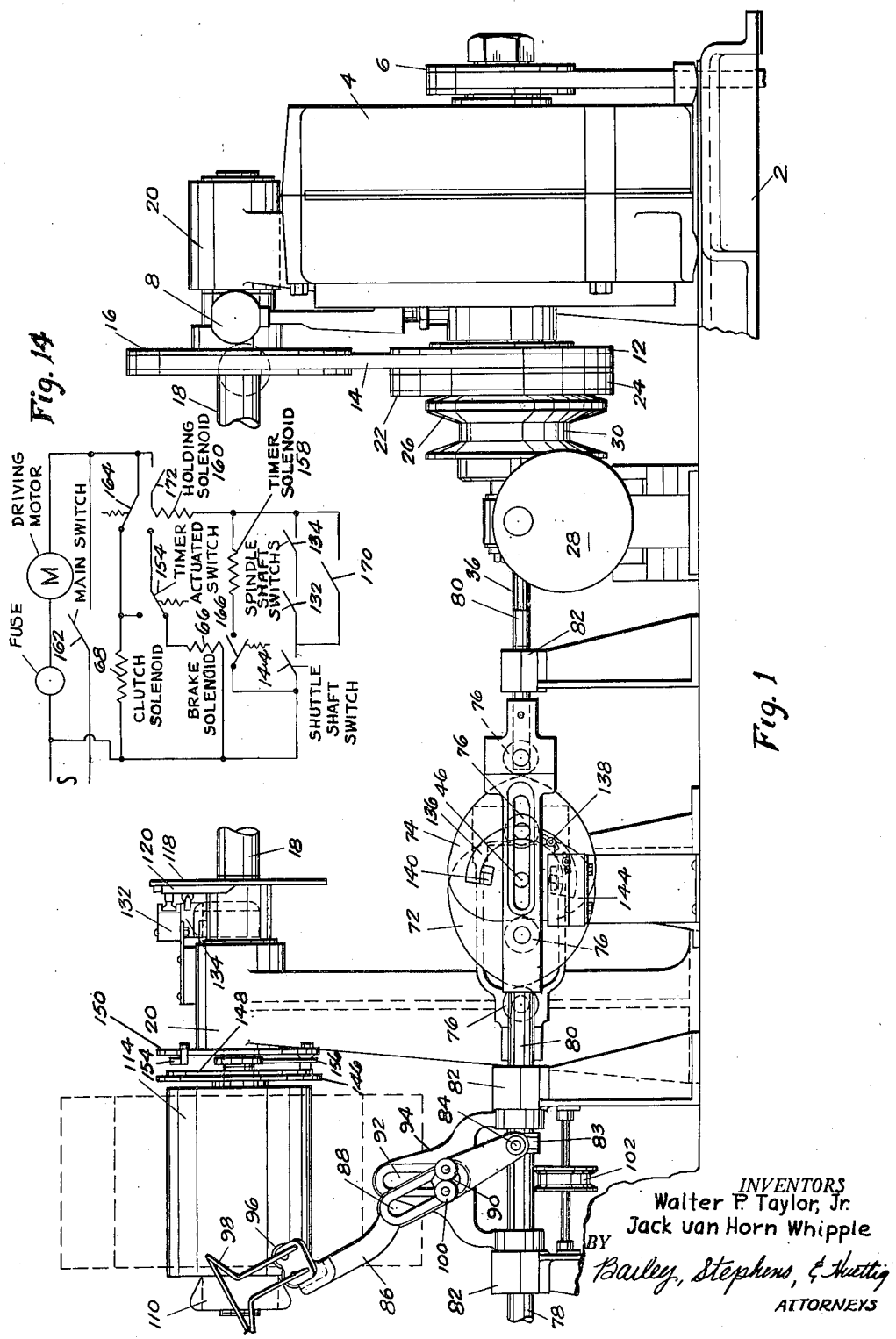
Fig. 1 shows in front elevation a machine embodying our invention.
Fig. 14 is a wiring diagram.

The machine includes a base 2 on which is mounted a conventional speed control device 4 driven by a pulley 6 from any suitable source of power or by hand. The control device 4 can be adjusted by handle 8. The output shaft of the control device carries a pulley 12 which through belt 14 drives pulley 16 on spindle supporting shaft 18 mounted in bearings 20.

A second pulley 22 on the output shaft of control device 4 by belt 24 drives one side of a suitable speed changing device of known type, for example, one having two conical grooves separated by a shiftable member 26, forming in effect two pulleys, the effective radius of one of which is decreased as the other is increased. The position of member 26 is controlled by hand wheel 28. The other groove drives belt 30, which engages and drives pulley 32, which through gearing 34 drives shaft 36.

Shaft 36 through crown gears 38 drives the guide actuating shaft 40. The other end of shaft 40 is mounted preferably by a bushing 42, in a hollow sleeve portion 44 of a shaft 46 mounted in a bearing 48. Fixed on shaft 40 is a clutch member 50 having along one face teeth adapted to mesh with teeth on the mating face of clutch member 52. This clutch member is carried by a ring 54 slidably keyed on the outside of sleeve portion 44. Ring 54 has an annular groove 56 engaged by pins 58 of forked lever 60 pivoted at 62. The lower end of this lever is connected to a rod 64 forming the core of a pair of solenoids 66, 68.

The other face of clutch member 52 is likewise provided with teeth, reversed in direction, engageable with teeth of a brake plate 70 fixed on bearing 48. The space between plates 50 and 70 is such that the braking teeth on members 52 and 70 engage as soon as possible after the clutch teeth on members 50 and 52 disengage.

Shaft 46 carries two heart-shaped cams 72, 74. Only cam 74 is active, cam 72 and the parts driven thereby being provided for balancing purposes. Each cam lies between two rollers 76 on slides 78, 80 respectively, so that these slides, which are held in guides 82, are reciprocated in opposite directions by the cams. Shaft 46 extends through slots in the slides.

Slide 80 has secured on it a clamp 83 to which is pivoted at 84 the lower end of guide lever 86. This lever has a slot 88 pivotally engaging a bolt 90 which is adjustable in vertical slot 92 formed in a guide 94 upstanding from guides 82. The guide 94 has guide rollers 96 between which the flexible material passes to the spindle. Bolt 90 also carries guide rollers 100, and the machine has further guides 102, 104 for the flexible material which may be drawn from any suitable source such as a reel 106.

Spindle shaft 18 has a threaded end 108, on which can be secured a nut 110. This holds against collar 112 (see Fig. 7) a diagonally split spindle 114, the parts of which are held together by pins 116 in one part entering into corresponding holes in the other part, or in any other suitable manner.

Shaft 18 carries, near one of the supports 20, a disc 118 (see Fig. 6). This disc has two cam members 120, 122, adjustable angularly around the shaft 18 by bolts 124 engaging in arcuate slots 126. Opposite the cams are rollers 128, 130 which, when pushed to the left (Fig. 1) by the cams actuate and close microswitches 132, 134.

Heart-shaped cam 74 has on its front face a cam member 136 adjustable angularly by slots engaging bolts 138. This member has, in the form shown, two cam portions 140, at 180° to each other, although one of these may be omitted for some winds. These cam portions engage a roller 142 which, when pushed to the right (Fig. 2), actuates and closes microswitch 144.

Shaft 18 also carries (see Figs. 8 to 11) a disc 146 of insulating material provided on one face with a projecting ring 148 of soft iron or other magnetic material. One of the bushings 20 supports a fixed plate 150 facing ring 148, and having on its face a stop 152 near the bottom and a microswitch 154 near the top. Swingably journalled on the face of the plate is a lever 156 having a hole in which is slidably mounted a small solenoid 158. This solenoid is at the same distance from the shaft axis as ring 148, and the stop 152 and operating button of microswitch 154 are in the path of the lever 156.

Switches 132, 134 and 144 are connected in series (see Fig. 14) with a source of current and solenoid 160, so that the solenoid is energized only when all three switches are closed. The two cams 120, 122 are provided so as to make it easy to vary the length of time during which switches 132, 134 are both closed. This is accomplished by varying the angular adjustment of the cams with respect to each other. For example, if cam 122 is shifted clockwise from the position shown, it will engage roller 130 soon after engagement of roller 128 by cam 120, and the two switches will be both closed for a longer period of time. When no adjustment is required, or when some other form is provided, one of the cams and switches can be dispensed with.

Clutch operating solenoid 68 is arranged in a circuit in parallel with the driving motor, so as to be normally energized whenever the main switch 162 is closed. The parallel connection contains a switch 164 normally urged to maintain the circuit through solenoid 68, but actuated when solenoid 160 is energized to open this connection and to close a connection through timer actuated switch 154 and brake solenoid 66. Brake solenoid 66 actuates and closes switch 166 to shunt switches 132, 134, 144 and to energize timer solenoid 158. Switches 170, 172 are normally open and normally closed (respectively) and are manually operable either for cutting out the whole circuit to render the hole forming mechanism inoperative (by opening switch 172) or to shunt out the spindle switches in adjusting the machine (by closing switch 170).

The machine hereinbefore described operates as follows:

The throw of guide lever 86 is adjusted by moving bolt 90 up or down in slot 92 until the travel of guide rollers 96 gives the axial length (that is, the length along the spindle axis) of the package to be wound. The spindle 114 is put in place, and the flexible material is led over guides 104, 102, 100 to rollers 96 and thence to the spindle. The change speed mechanism 26, 28 is set so that for each selected number of revolutions of the spindle the guide will make a number of complete reciprocations which is only slightly different from an integral multiple of one half the number of revolutions of the spindle.

In the absence of the clutch mechanism, or some other arrangement for producing temporary differences in relative speed between the guide and spindle, the operation of the machine would then produce on the spindle the ordinary universal wind, that is, a series of layers of helical coils extending from end to end of the package and having the crossovers of successive coils evenly angularly spaced around the package.

Figs. 15 to 20 show types of packages which are produced by the operation of the machine with the clutch mechanism in operation.

With reference to Fig. 19 there is shown a winding diagram of a package produced with a "one" wind and a positive advance utilizing the stopping of the guide to produce the hole. In this diagram, a layer is shown which may be considered to start at $e^1$. The spindle is turning in the direction of the arrow, and the guide is moving from left to right. At $e^2$, the guide reaches the end of its travel along the spindle and starts back towards the left, to $e^3$. Point $e^4$ is the same as $e^3$, and this coil ends at $e^5$. The guide now starts back towards the right at $e^6$, continuing to $e^7$ (and the same point $e^8$) and then to $e^9$, where travel to the left starts again. At a point during this travel, as at $e^{10}$, the movement of the guide is stopped, in the manner to be described below, for a predetermined angular movement of the spindle which is preferably an exact multiple of the angle of advance. When this occurs, the spindle, continuing to turn, will wind the flexible material straight around it (vertically in Fig. 19) to the point $e^{11}$. At this point, reciprocation of the guide is resumed, and the material runs to $e^{12}$, $e^{13}$ (the same point as $e^{12}$), $e^{14}$, then starts back at $e^{15}$ to $e^{16}$, $e^{17}$ (the same point as $e^{16}$), $e^{18}$, then back at $e^{19}$ to $e^{20}$. The remainder of the layer is then completed without further interruption of the guide, laying successive coils side by side with substantially equal spacing therebetween.

There results thus a sort of gutter or valley extending spirally twice around the spindle. This gutter is defined by the lines joining points $e^8$, $e^9$, $e^{10}$, $e^3$, $e^4$, $e^5$, $e^6$, $e^7$ on one side and by the lines joining points $e^{17}$, $e^{18}$, $e^{19}$, $e^{11}$, $e^{12}$, $e^{13}$, $e^{14}$, $e^{15}$, $e^{16}$ on the other. The two spirals of this gutter intersect at $e^h$. Since each gutter section contains only the parts running transversely of the gutter, a hole will be formed at this intersection.

Successive layers of the same type, or of other winds if desired, are laid on the spindle. Of course, the holes in successive layers are caused to overlie each other, at least to a great extent, so that the package as finally produced has a generally radially directed opening into the spindle core hole.

Referring now to the operation of the machine in making such a package, it will be assumed that the guide is normally driven at a speed corresponding to 26 reciprocations in each direction for each 53 rotations of the spindle. Only one of the cams, such as 140, is used. Under these conditions, switches 132 and 134 will be closed once in each revolution of the spindle and switch 144 will be closed once in each complete reciprocation of the guide. Once in each 53 rotations of the spindle, the three switches will be closed at the same time. When this occurs, solenoid 160 is energized and moves switch arm 164 from its normal upper position to its lower position. This breaks the circuit to clutch solenoid 68 and closes the circuit to brake solenoid 66. The brake solenoid in turn closes switch 166, shorting switches 132, 134, 144 and energizing timer solenoid 158.

When the clutch 50, 52 is disengaged and the brake 52, 70 is engaged, reciprocation of the guide is stopped, as at $e^{10}$ in Fig. 19. Because of the momentum of the system, cam 140 may allow switch 144 to open before the guide shaft 46 stops, but switch 166 has been closed, so that solenoids 66 and 160 remain energized. Switches 132, 134 will open as shaft 18 continues to turn, but this opening is ineffective for the same reason.

Energization of solenoid 158 causes it to attract and cling to ring 148, which is turning with shaft 18. Lever 156 will then be turned clockwise (Fig. 9) until it strikes the button of microswitch 154, shifting the movable contact of that switch from brake solenoid 66 to clutch solenoid 68. Since the brake solenoid is deenergized, switch 166 will open, deenergizing solenoid 160 (since until the end of another cycle or layer, switch 144 will not again be closed when both switches 132 and 134 are closed). Switch 164 will then return to its normal position, feeding clutch solenoid 68 directly. Solenoid 158 will also be deenergized, and arm 156 will fall back by gravity until it rests on stop 152. When this reenergization of the clutch and release of the brake takes place (point $e^{11}$, Fig. 19), the guide will resume its reciprocation, but the line of material laid down will be spaced a substantial distance from the preceding one, so as to form the valley hereinbefore described.

At the end of the complete cycle or layer, the switches 132, 134, 144 will again be closed simultaneously, and the same action will occur in the next layer.

Figure 15:
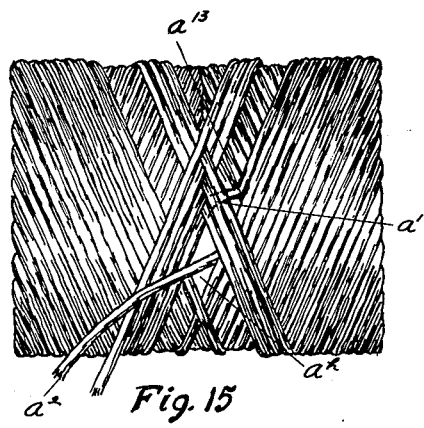
Figs. 15 and 16 are perspective views of two types of package produced on the machine.
Figure 10:
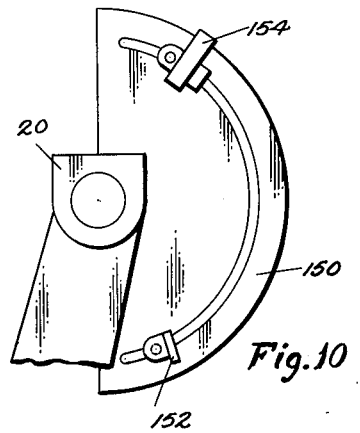
Fig. 10 is an end view of the fixed plate thereof.

Fig. 15 shows a package produced by stopping the spindle while the guide continues to move, and Fig. 17 is a winding diagram of such a package. The machine for producing such a package would have the cam 140 and the clutch and brake mechanism 50, 52, 70 on the spindle shaft and the cams 120, 122 and timing device 146, 156 on the guide actuating shaft. The operation would be exactly similar, stopping the rotation of the spindle for a given period always corresponding to the same angular displacement of the guide operating shaft and to the same lineal displacement of the guide along the spindle. The package shown is formed with a single cam 140, with a negative advance and a "one" wind. It is assumed that the guide will normally operate at a speed corresponding to 30 reciprocations in each direction for each 59 rotations of the spindle. The spindle turns in the direction of the arrow (Fig. 17).

Starting from a point $a^1$, at which the guide is moving towards the right, the material is laid to $a^2$, reverses at $a^3$ and continues to $a^4$, $a^5$ (which is the same as $a^4$), and $a^6$. It reverses at $a^7$, runs to $a^8$, $a^9$ (the same as $a^8$), to $a^{10}$, reverses at $a^{11}$ and runs to $a^{12}$. At this point, rotation of the spindle is stopped and the guide continues, laying the material lengthwise of the spindle to $a^{13}$, where rotation of the spindle resumes. The material is then laid to $a^{14}$, $a^{15}$ (which is the same), $a^{16}$, reverses at $a^{17}$ to $a^{18}$, $a^{19}$ (which is the same), $a^{20}$, and reverses at $a^{21}$ to $a^{22}$. The remainder of the layer is then laid with substantially equal spacing.

This produces a valley marked out by a first line $a^5$, $a^6$, $a^7$, $a^8$, $a^9$, $a^{10}$, $a^{11}$, $a^{12}$, $a^4$; and by a second line $a^{15}$, $a^{16}$, $a^{17}$, $a^{18}$, $a^{19}$, $a^{20}$, $a^{21}$, $a^{13}$, $a^{14}$. The valley forms two spirals around the package crossing and forming the hole $a^h$ at the longitudinal center thereof. The end $a^e$ of the flexible material is led out through this hole.

Figure 16:
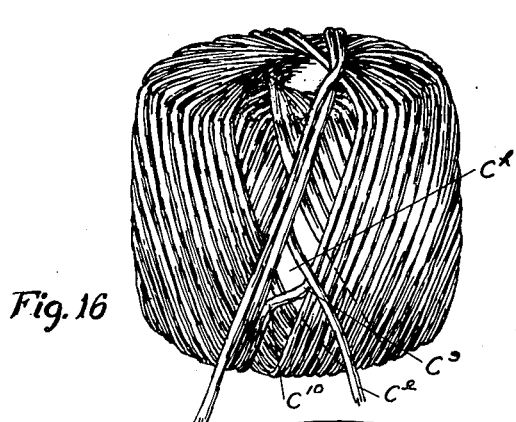
Figure 9:
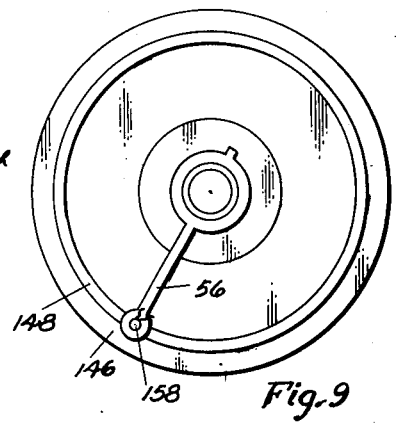
Fig. 9 is an end view of the lever and disc of such mechanism.
Figure 12:
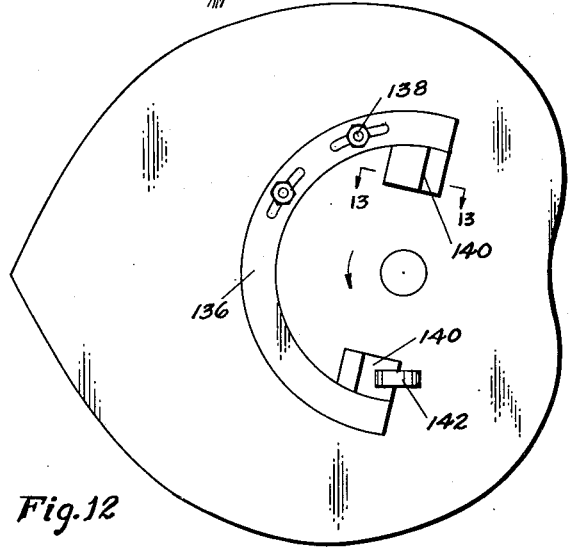
Fig. 12 is an enlarged front view of one of the cams.
Figure 13:
Fig. 13 is a cross section on the line 13—13 of Fig. 12.

Figs. 16 and 18 show a package of wire or the like and the winding diagram of one layer of this package. This package is formed with a "one-half wind" and with a positive advance. Two cams are used on the spindle shaft. Starting at a point such as $c^1$, the guide is moving towards the right as the spindle turns in the direction of the arrow. The guide is normally driven at a speed corresponding to 25 reciprocations in each direction during 25½ rotations of the spindle. Starting at $c^1$, the coil goes to $c^2$, reverses direction at $c^3$ to $c^4$, reverses again to $c^5$, $c^6$ (which is the same as $c^5$) to $c^7$, and reverses again at $c^8$. At $c^9$, the guide is stopped, and the material winds straight around the spindle to $c^{10}$, where movement of the guide is resumed. This movement continues to $c^{11}$, reverses to $c^{12}$, $c^{13}$ (which is the same as $c^{12}$), continues to $c^{14}$, reverses at $c^{15}$ and continues to $c^{16}$. The regular laying of successive coils then continues until point $d^1$ is reached, at which point the guide is moving towards the left. The winding goes to $d^2$, where it reverses, then to $d^3$ and again reverses, to $d^4$, $d^5$ (which is the same as $d^4$), to $d^6$ where it reverses, then to $d^7$ where movement of the guide is stopped. Again the material is laid straight around the spindle to $d^8$, where movement of the guide is resumed. The material is now laid to $d^9$, reversed to $d^{10}$, $d^{11}$ (which is the same as $d^{10}$), then to $d^{12}$, reversed to $d^{13}$, and reversed again to $d^{14}$.

This creates two valleys extending spirally around the coil. One of these valleys is defined by a first line $c^6$, $c^7$, $c^8$, $c^9$, $c^4$, $c^5$ and by a second line $c^{13}$, $c^{14}$, $c^{15}$, $c^{10}$, $c^{11}$, $c^{12}$. The other valley is defined by a first line $d^5$, $d^6$, $d^7$, $d^3$, $d^4$ and a second line $d^{11}$, $d^{12}$, $d^8$, $d^9$, $d^{10}$. Because cams 140 are 180° apart, these valleys will cross twice at substantially the longitudinal center of the package, forming two holes $c^h$. The inner end $c^e$ of the flexible material is led out through one of these holes, as shown in Fig. 16.

Fig. 20 shows a winding diagram for a "one and a half" wind using two cams 140 and with a positive advance. It will be assumed that the guide is normally driven at a speed corresponding to 72 reciprocations of the guide in each direction for each 217 rotations of the spindle. The spindle is driven in the direction of the arrow. Starting at some point $f^1$, where the guide is moving towards the left, the flexible material will be laid to $f^2$, $f^3$ (the same as $f^2$), $f^4$, to $f^5$ where it is reversed, to $f^6$, $f^7$ (the same as $f^6$), $f^8$, is reversed at $f^9$ to $f^{10}$, $f^{11}$ (the same as $f^{10}$) to $f^{12}$. At this point, movement of the guide is stopped and the flexible material is laid straight around the spindle to the point $f^{13}$, where movement of the guide is resumed. The material is then laid to $f^{14}$, $f^{15}$ (the same as $f^{14}$), $f^{16}$, reversed at $f^{17}$ to $f^{18}$, $f^{19}$ (the same as $f^{18}$), $f^{20}$, reversed at $f^{21}$ to $f^{22}$, $f^{23}$ (the same as $f^{22}$) and to $f^{24}$. The regular laying of successive coils continues until the material reaches a point such as $g^1$, where the guide is moving towards the right. The material is then laid to $g^2$, $g^3$ (the same as $g^2$), $g^4$, reversed at $g^5$ to $g^6$, $g^7$ (the same as $g^6$), $g^8$, reversed at $g^9$ to $g^{10}$, $g^{11}$ (the same as $g^{10}$) to $g^{12}$. At this point, movement of the guide is again stopped and the material is laid straight around the spindle to $g^{13}$, where movement of the guide is resumed. The laying of the material is then continued to $g^{14}$, $g^{15}$ (the same as $g^{14}$), $g^{16}$, reversed at $g^{17}$, to $g^{18}$, $g^{19}$ (the same as $g^{18}$), $g^{20}$, reversed at $g^{21}$ to $g^{22}$, $g^{23}$ (the same as $g^{22}$) to $g^{24}$. Regular laying of the coils is then resumed for the remainder of the layer.

The layer so produced has two valleys; one is defined on one side by the line $f^{11}$, $f^{12}$, $f^2$, $f^3$, $f^4$, $f^5$, $f^6$, $f^7$, $f^8$, $f^9$, $f^{10}$, and on the other by the line $f^{23}$, $f^{13}$, $f^{14}$, $f^{15}$, $f^{16}$, $f^{17}$, $f^{18}$, $f^{19}$, $f^{20}$, $f^{21}$, $f^{22}$. The other valley is refined on one side by the line $g^{11}$, $g^{12}$, $g^2$, $g^3$, $g^4$, $g^5$, $g^6$, $g^7$, $g^8$, $g^9$, $g^{10}$ and on the other by the line $g^{23}$, $g^{13}$, $g^{14}$, $g^{15}$, $g^{16}$, $g^{17}$, $g^{18}$, $g^{19}$, $g^{20}$, $g^{21}$, $g^{22}$. These valleys intersect at a number of points so that several holes are formed. It is preferable to bring out the inner end of the flexible material through one of the holes $f^h$ at the longitudinal center of the package.

The importance of the timing device will now be explained, with special reference to Fig. 23.

It is often desirable to wind successive layers so that the cross-overs of each layer lie between the cross-overs of the adjoining layers, with the result that the coils of successive layers interfit, giving a more compact and self-sustaining package. For example, as shown in Fig. 23, layers 201 and 204 are formed by coils $a$, layers 202 and 205 by coils $b$, and layers 203 and 206 by coils $c$. The angular distance from $a$ to $b$, $b$ to $c$ and $c$ to $a$ is one-third the angular distance between successive coils $a$. This fraction may be made to vary for different packages.

Such a package is obtained by setting the machine so that $$(x-i)y+(1-z)y=360°$$

in which formula $x=$the number of cross-overs in each layer (a whole number);
$y=$the number of degrees of advance;
$z=$the desired fractional distance between the cross-overs (or coils) in successive layers (⅓, in the example given).

In making such a package, it is important that the coils $b$ of layers 202 and 205 should not overlie, or be radially aligned with, the coils $a$ of layers 201 and 204, and likewise the coils $c$ of layers 203 and 206 must not be aligned with either coils $a$ of layers 201, 204 or coils $b$ of layers 202, 205. A package with a radial hole can be formed with switches 132, 134, 144 only, since when these switches are closed they will disengage the clutch and engage the brake. (In such a machine, the switches 132, 134 would be arranged to the left, Fig. 14, of the switch 144; so that, when all three switches are closed, switch 166 closes and shunts switch 144 only, the circuit then remaining closed until one of switches 132, 134 is opened.) But, when laying the cross-overs and coils in successive layers as shown in Fig. 23, this would be unsatisfactory because the action of the brake may being at different times during the joint closing period of switches 132, 134, namely when switch 144 closes, but always ends at the same time, when the first of these two switches opens. As a result, the length of the braking action would vary. But it is clear that, for proper laying of the coils in this type of package, the braking period must be an exact multiple of the advance, so as to lay, for example, coil $a$ of layer 204 exactly over coil $a$ of layer 201 after the two braking actions that form the holes in layers 202 and 203. Since the timing mechanism gives the same angular duration to the braking action at each operation, this result will be accomplished.

Without the timing mechanism, the coils produced by the machine are likely to be less compact, and to bulge on one side, and the valleys are accentuated. However, within the broadest scope of the invention, a machine not utilizing a timing mechanism is contemplated. This will produce coils with radial holes which are satisfactory for many purposes.

One type of coil which can be produced with or without a timing mechanism may be substantially similar to that shown in the earlier application of Walter P. Taylor, Jr., referred to above. Such a coil is shown in Fig. 22, and its winding diagram in Fig. 21. This coil has all the cross-overs in substantially one half (the lower half in Fig. 22) of the coil, and the hole $h^h$ is formed between the bights of the successive figure-8 coils, these bights lying in planes forming angles of not over about 90° between them. The free inner end $h^e$ is led out through this hole.

A winding diagram of such a coil is shown in Fig. 21. This is wound with a positive advance, the cross-overs of each layer being mid-way between those of the adjacent layers. The coils of one layer are shown in solid lines and of the other layer in broken lines.

Starting from point $h_0$, $h^1$ (same as $h_0$) with the guide starting to the right, the first layer runs to $h^2$, $h^3$ (same as $h^2$), reverses at $h^4$ to $h^5$, $h^6$ (same as $h^5$), reverses at $h^7$ to $h^8$, $h^9$ (same as $h^8$), reverses at $h^{10}$ to $h^{11}$, $h^{12}$ (same as $h^{11}$), reverses at $h^{13}$ to $h^{14}$, $h^{15}$ (same as $h^{14}$), reverses at $h^{16}$, to $h^{17}$, $h^{18}$ (same as $h^{17}$), reverses at $h^{19}$ to $h^{20}$, $h^{21}$ (same as $h^{20}$), reverses at $h^{22}$ to $h^{23}$, $h^{24}$ (same as $h^{23}$), reverses at $h^{25}$ to $h^{26}$, $h^{27}$ (same as $h^{26}$), reverses at $h^{28}$ to $h^{29}$, $h^{30}$ (same as $h^{29}$), reverses at $h^{31}$ to $h^{32}$, $h^{33}$ (same as $h^{32}$), reverses at $h^{34}$ to $h^{35}$, $h^{36}$ (same as $h^{35}$), reverses at $h^{37}$ to $h^{38}$, $h^{39}$ (same as $h^{38}$), reverses at $h^{40}$ to $h^{41}$, $h^{42}$ (same as $h^{41}$), and reverses at $h^{43}$ to $h^{44}$, $h^{45}$ (same as $h^{44}$). At point $h^{46}$ movement of the guide stops while the spindle continues to turn, laying the material to $h^{47}(k^1)$ and starting the second layer. Resumption of movement of the guide then forms a second layer designated similarly by points $k^2$ to $k^{47}$. At $k^{48}$, movement of the guide is again stopped and the spindle turns to lay the material to $k^{49}$. At this point, movement of the guide is resumed and a third layer like $h^0$ to $h^{47}$ is formed, then another layer $k^1$ to $k^{49}$ and so on.

The package so produced may, if desired, be given some support by a strip of paper, cloth or other suitable material 208 adhesively secured on the outside thereof.

While we have described herein some embodiments of our invention, we wish it to be understood that we do not intend to limit ourselves thereby except within the scope of the claims hereto or hereinafter appended.

We claim:

1. A package winding machine comprising a spindle, means to rotate said spindle, a guide for flexible material, means to reciprocate said guide along said spindle, said reciprocating means being slightly out of phase with said rotating means so as to lay up successive coils side by side on the spindle, and means controlled in synchronism with the movement of the spindle and guide to vary after periods corresponding to a substantial number of revolutions of the spindle and at the same relative angular position of the spindle with respect to the guide the relative speed of movement of the spindle and guide so as to produce a wider spacing between certain of said coils, thereby leaving a hole through the package radially thereof.

2. A package winding machine comprising a spindle, means to rotate said spindle, a guide for flexible material, means to reciprocate said guide along said spindle, said reciprocating means being slightly out of phase with said rotating means so that during a given number of rotations of the spindle said guide is reciprocated substantially a whole number of times which differs from on integral multiple of one-half such number of rotations, whereby to lay up successive helical coils on the spindle each crossing the next preceding coil, the crossing points being successively angularly spaced around the package, means to vary for short periods of time the relative speed of movement of the spindle and guide so as to produce a wider spacing between certain of said coils, and means controlled in synchronism with the movement of the spindle and guide to control said last means to operate at least once for each such number of reciprocations of the guide and at the same angular position of the spindle, thereby leaving a hole through the package radially thereof.

3. A package winding machine comprising a spindle member, means to rotate said spindle member, a guide member for flexible material, means to reciprocate said guide member along said spindle member, said reciprocating means being slightly out of phase with said rotating means so that during a given number of rotations of the spindle member said guide member is reciprocated substantially a whole number of times which differs from an integral multiple of one-half such number of rotations, whereby to lay up successive helical coils on the spindle each crossing the next preceding coil, the crossing points being successively angularly spaced around the package, and means controlled in synchronism with the movement of the spindle and guide member to interrupt for short periods of time the movement of one of said members at least once for each such number of reciprocations of the guide member and at the same angular position of the spindle so as to produce a wider spacing between certain of said coils, thereby leaving a hole through the package radially thereof.

4. A package winding machine comprising a spindle, means to rotate said spindle, a guide for flexible material, means to reciprocate said guide along said spindle, said reciprocating means being slightly out of phase with said rotating means so that during a given number of rotations of the spindle said guide is reciprocated substantially a whole number of times which differs from an integral multiple of one-half such number of rotations, whereby to lay up successive helical coils on the spindle each crossing the next preceding coil, the crossing points being successively angularly spaced around the package, and means controlled in synchronism with the movement of the spindle and guide to interrupt for short periods of time the movement of the guide at least once for each such number of reciprocations of the guide and at the same angular position of the spindle so as to produce a wider spacing between certain of said coils, thereby leaving a hole through the package radially thereof.

5. A package winding machine comprising a spindle mounted for rotation and a guide for flexible material mounted for reciprocation along the spindle, a driving means, means connecting said spindle to said driving means for rotation thereby, means connecting said guide to said driving means for reciprocation thereby, said two connecting means being so arranged that the reciprocation of the guide is slightly out of phase with the rotation of the spindle so that during a given number of rotations of the spindle said guide is reciprocated substantially a whole number of times which differs from an integral multiple of one-half such number of rotations, whereby to lay up successive helical coils on the spindle each crossing the next preceding coil, the crossing points being successively angularly spaced around the package, means for rendering one of said connecting means inactive for short periods of time so as to produce a wider spacing between certain of said coils, and means controlled in synchronism with the movement of the spindle and guide to control said last means to operate at least once for each such number of reciprocations of the guide and at the same angular position of the spindle, thereby leaving a hole through the package radially thereof.

6. In a machine as claimed in claim 5, said inactivating means including braking means.

7. A package winding machine comprising a spindle mounted for rotation and a guide for flexible material mounted for reciprocation along the spindle, a driving means, means connecting said spindle to said driving means for rotation thereby, means connecting said guide to said driving means for reciprocation thereby, said two connecting means being so arranged that the reciprocation of the guide is slightly out of phase with the rotation of the spindle so that during a given number of rotations of the spindle said guide is reciprocated substantially a whole number of times which differs from an integral multiple of one-half such number of rotations, whereby to lay up successive helical coils on the spindle each crossing the next preceding coil, the crossing points being successively angularly spaced around the package, and means controlled by the relative phase positions of the spindle and guide for rendering one of said connecting means inactive for a short period of time at least once for each such number of reciprocations of the guide and at the same angular position of the spindle so as to produce a wider spacing between certain of said coils, thereby leaving a hole through the package radially thereof.

8. A package winding machine comprising a spindle mounted for rotation and a guide for flexible material mounted for reciprocation along the spindle, a driving means, means connecting said spindle to said driving means for rotation thereby, means connecting said guide to said driving means for reciprocation thereby, said two connecting means being so arranged that the reciprocation of the guide is slightly out of phase with the rotation of the spindle so that during a given number of rotations of the spindle said guide is reciprocated substantially a whole number of times which differs from an integral multiple of one-half such number of rotations, whereby to lay up successive helical coils on the spindle each crossing the next preceding coil, the crossing points being successively angularly spaced around the package, a clutch in one of such connecting means, and mean controlled by the relative phase positions of the spindle and guide for disengaging said clutch for a short period of time at least once for each such number of reciprocations of the guide and at the same angular position of the spindle so as to produce a wider spacing between certain of said coils, thereby leaving a hole through the package radially thereof.

9. In a machine as claimed in claim 8, means operated simultaneously with said clutch disengaging means to brake the member with which such connecting means are associated when the clutch is disengaged.

10. A package winding machine comprising a spindle, means to rotate said spindle, a guide for flexible material, means to reciprocate said guide along said spindle, said reciprocating means being slightly out of phase with said rotating means so that during a given number of rotations of the spindle said guide is reciprocated substantially a whole number of times which differs from an integral multiple of one-half such number of rotations, whereby to lay up successive helical coils on the spindle each crossing the next preceding coil, the crossing points being successively angularly spaced around the package, means to vary for short periods of time the relative speed of movement of the spindle and guide by reducing the relative rate of movement of the slower moving of the two so as to produce a wider spacing between certain of said coils, and means controlled in synchronism with the movement of the spindle and guide to control said last means to operate at least once for each such number of reciprocations of the guide and at the same angular position of the spindle, thereby leaving a hole through the package radially thereof.

11. In a machine as claimed in claim 7, said inactivating means including an electrically operated member, means to supply current to said member, two switch mechanisms in series in said connecting means, and means to close said switch mechanisms at points in the movements of the spindle and guide respectively.

12. A package winding machine comprising a pair of shafts, means to drive said shafts slightly out of phase with one another so that during a given number of rotations of one of the shafts the other shaft turns substantially a whole number of times which differs from an integral multiple of one-half such number of rotations, a spindle mounted for rotation, a first means connecting the first of said shafts to said spindle to rotate the same, a guide mounted for reciprocation along said spindle, a second means connecting the second of said shafts to said guide to oscillate the same, one of said connecting means including a clutch, and means controlled by the relative movement of said two connecting means to disengage said clutch periodically and at the same angular position of the spindle.

13. A machine as claimed in claim 12, in which said clutch is in said second connecting means.

14. A machine as claimed in claim 12, in which said clutch disengaging means includes at least one cam in each of said connecting means, the cam in the connecting means which includes the clutch being on the opposite side of the clutch from the driving means, and switches actuated by said cams.

15. A machine as claimed in claim 14 having means to brake the portion of the connecting means on the opposite side of the clutch from the driving means when the clutch is disengaged.

16. A package winding machine comprising a pair of shafts, means to drive said shafts slightly out of phase with one another so that during a given number of rotations of one of the shafts the other shaft turns substantially a whole number of times which differs from an integral multiple of one-half such number of rotations, a spindle mounted for rotation, a first means connecting the first of said shafts to said spindle to rotate the same, a guide mounted for reciprocation along said spindle, a second means connecting the second of said shafts to said guide to oscillate the same, said second connecting means including a third shaft aligned with said second shaft, a first clutch member slidably keyed on one of said second and third shafts, a second cooperating clutch member fixed on the other of said second and third shafts, and means controlled by the relative movement of said two connecting means to shift said first clutch member periodically out of engagement with said second clutch member and at the same angular position of the spindle.

17. In a machine as claimed in claim 16, in which said first clutch is mounted on the third shaft, a third fixed clutch member engageable by said first clutch member when the same is moved out of engagement with the second clutch member to brake said third shaft.

18. In a machine as claimed in claim 17, said last means including at least one cam in each of said connecting means, and switches controlled by said cams.

19. In a machine as claimed in claim 16, said last means including at least one cam in each of said connecting means, and switches controlled by said cams.

20. A package winding machine comprising a spindle, means to rotate said spindle, a source of supply of flexible material, guiding means to cause material from said supply to shift back and forth along the spindle, said guiding means being slightly out of phase with said rotating means so that during a given number of rotations of the spindle the guiding means shifts the material back and forth along the spindle a whole number of times which differs from an integral multiple of one-half such number of rotations, whereby to lay up successive helical coils on the spindle each crossing the next preceding coil, the crossing points being successively angularly spaced around the package, means to vary for short periods of time the relative speed of movement of the spindle and guiding means so as to produce a wider spacing between certain of said coils, and means controlled in synchronism with the movement of the spindle and guiding means to control said last means to operate at least once for each such number of shifting movements of the guiding means and at the same angular position of the spindle, thereby leaving a hole through the package radially thereof.

21. A machine as claimed in claim 12, in which said clutch disengaging means includes at least one cam in each of said connecting means, the cam in the connecting means which includes the clutch being on the opposite side of the clutch from the driving means, and switches actuated by said cams, means controlled by the simultaneous closing of the switches to shunt the switches, means controlled by a predetermined movement of one of the connecting means starting from the closing of both the switches to open said shunt.

22. A package winding machine comprising a pair of shafts, means to drive said shafts slightly out of phase with one another so that during a given number of rotations of one of the shafts the other shaft turns substantially a whole number of times which differs from an integral multiple of one-half such number of rotations, a spindle mounted for rotation, a first means connecting the first of said shafts to said spindle to rotate the same, a guide mounted for reciprocation along said spindle, a second means connecting the second of said shafts to said guide to oscillate the same, one of said connecting means including a clutch, a pair of switches, means controlled by the movement of each connecting means for periodically closing one of the switches, means controlled by the simultaneous closing of both switches to disengage the clutch and to shunt the switches, and means controlled by a predetermined movement of one of the connecting means starting from the closing of both the switches to open said shunt.

23. A package winding machine comprising a pair of shafts, means to drive said shafts slightly out of phase with one another so that during a given number of rotations of one of the shafts the other shaft turns substantially a whole number of times which differs from an integral multiple of one-half such number of rotations, a spindle mounted for rotation, a first means connecting the first of said shafts to said spindle to rotate the same, a guide mounted for reciprocation along said spindle, a second means connecting the second of said shafts to said guide to oscillate the same, one of said connecting means including a clutch, a pair of switches, means controlled by the movement of each connecting means for periodically closing one of the switches, a solenoid normally holding said clutch engaged, a second solenoid adapted when energized to disengage the clutch, means controlled by the simultaneous closing of both said switches to break the circuit to said first solenoid, to close the circuit of said second solenoid and to shunt said switches, and means controlled by a predetermined movement of one of the connecting means starting from the closing of both the switches to open said shunt.

24. In a machine as claimed in claim 23, said second solenoid having means associated therewith to brake the portion of the connecting means beyond the clutch.

25. A package winding machine comprising a spindle, a guide for flexible material, means to produce such relative movements between said spindle and said guide as to cause the material from said guide to shift back and forth along the spindle and to lay around the spindle, said movements being slightly out of phase so that during a given number of movements to lay the material around the spindle the material is shifted back and forth along the spindle a whole number of times which differs from an integral multiple of one-half such number of laying movements, whereby to lay up successive helical coils on the spindle each crossing the next preceding coil, the crossing points being successively angularly spaced around the package, means to vary for short periods of time the relative speeds of such movements so as to produce a wider spacing between certain of said coils, and means controlled in synchronism with the movement of the spindle and guide to control said last means to operate at least once for each such number of shifting movements of the flexible material and at the same angular position of the spindle, thereby leaving a hole through the package radially thereof.

26. In a machine as claimed in claim 25, timing means controlled by one of such movements to restore the normal relative speeds of movement after a predetermined amount of such controlling movement from the time of such variation.

27. In a machine as claimed in claim 1, means controlled by the movement of one of the spindles and shuttles to restore the normal relative speeds of movement after a predetermined amount of such controlling movement from the time of such variation.

28. In a machine as claimed in claim 3, means controlled by the uninterrupted movement of the other of said members to restore such interrupted movement after a predetermined amount of such controlling movement from the time of such variation.

29. In a machine as claimed in claim 4, means controlled by the movement of the spindle to restore the movement of the guide after a predetermined amount of movement of the spindle after such interruption.

30. A method of winding a package of flexible material which comprises producing such relative movements between a spindle and a source of flexible material as to cause the material from said source to shift back and forth along the spindle and to lay around the spindle, said movements being slightly out of phase so that during a given number of movements to lay the material around the spindle the material is shifted back and forth along the spindle a whole number of times which differs from an integral multiple of one-half such number of laying movements, whereby to lay up successive helical coils on the spindle each crossing the next preceding coil, the crossing points being successively angularly spaced around the package, and varying for short periods of time and at the same angular position of the spindle the relative speed of movement of the spindle and source so as to produce a wider spacing between certain of said coils, thereby leaving a hole through the package radially thereof.

31. A method of winding a package of flexible material which comprises rotating a spindle, causing flexible material to shift back and forth along the spindle, said rotation being slightly out of phase with said shifting so that during a given number of rotations of the spindle the material shifts back and forth along the spindle a whole number of times which differs from an integral multiple of one-half such number of rotations, whereby to lay up successive helical coils on the spindle each crossing the next preceding coil, the crossing points being successively angularly spaced around the package, and varying for short periods of time and at the same angular position of the spindle the relative speeds of rotation of the spindle and shifting of the material so as to produce a wider spacing between certain of said coils, thereby leaving a hole through the package radially thereof.

32. In a method as claimed in claim 30, maintaining the period during which such variation takes place equal to the period of a predetermined amount of one of such movements.

WALTER P. TAYLOR, Jr.
JACK Van HORN WHIPPLE.

References Cited in the file of this patent
UNITED STATES PATENTS

| Number | Name | Date |
|---|---|---|
| Re. 16,859 | Pierson | Jan. 24, 1928 |
| 579,054 | Garsed | Mar. 16, 1897 |
| 954,344 | Rhoades | Apr. 5, 1910 |
| 963,114 | Berry | July 5, 1910 |
| 1,228,424 | Foster | June 5, 1917 |
| 1,248,898 | Parks | Dec. 4, 1917 |
| 2,338,721 | Jackson | Jan. 11, 1944 |